United States Patent [19]
Kuhlman

[11] Patent Number: 4,515,015
[45] Date of Patent: May 7, 1985

[54] CAPACITANCE LEVEL SENSOR FOR USE WITH VISCOUS, ELECTRICALLY CONDUCTIVE MATERIALS

[75] Inventor: George A. Kuhlman, St. Charles, Ill.

[73] Assignee: Magnetrol International, Incorporated, Downers Grove, Ill.

[21] Appl. No.: 466,932

[22] Filed: Feb. 16, 1983

[51] Int. Cl.$^3$ .................. G01F 23/26; G01R 27/26
[52] U.S. Cl. .................. 73/304 C; 324/61 R; 331/65; 340/870.16
[58] Field of Search .............. 73/304 C; 331/65; 307/308; 361/284

[56] References Cited

U.S. PATENT DOCUMENTS

| | | | |
|---|---|---|---|
| 2,932,970 | 4/1960 | Zito | 73/304 C |
| 3,135,916 | 6/1964 | Tannenbaum et al. | 73/304 C |
| 3,375,716 | 4/1968 | Hirsch | 73/304 C |
| 3,821,900 | 7/1974 | Preikschaf | 73/304 C |
| 4,147,934 | 4/1979 | Tomimasu et al. | 307/308 X |
| 4,149,231 | 4/1979 | Bukosky et al. | 324/60 D |
| 4,188,549 | 2/1980 | Dorais | 307/308 |
| 4,295,370 | 10/1981 | Bristol | 361/284 X |
| 4,296,472 | 10/1981 | Sarkis | 340/870.16 X |
| 4,314,478 | 2/1982 | Beaman | 73/304 C |
| 4,347,740 | 9/1982 | Townsend | 73/304 C |
| 4,347,741 | 9/1982 | Geiger | 73/304 C |
| 4,383,445 | 5/1983 | Siegel et al. | 73/304 C |

OTHER PUBLICATIONS

Linear Applications Handbook 1, National Semiconductor, Nov. 1967, p. AN31-6 ("Free-Running Multivibrator").
"Voltage Comparators", National Semiconductor LM 160 Chip, Specification Sheets, pp. 5-35 to 5-37.

*Primary Examiner*—Daniel M. Yasich
*Attorney, Agent, or Firm*—Wood, Dalton, Phillips, Mason, & Rowe

[57] ABSTRACT

A level sensor for sensing the level of viscous, electrically conducting materials in a tank includes a variable capacitor, the capacitance of which varies in response to changing material level height in the tank. The variable capacitance is connected through a charging resistor to a comparator to form an astable multivibrator which develops an output signal having a period dependent partly upon the capacitance of the variable capacitor. The charging resistor has a resistance which is small with respect to the resistance of the material so that build up or coating of material on the variable capacitor has little or no effect on the measurements. The frequency of the output signal from the multivibrator is divided to derive a signal of relatively low frequency which may be coupled to a remote location by a two wire conductor.

12 Claims, 6 Drawing Figures

PRIOR DEVICE  RI ≫ Rm & Rm'

RI ≪ Rm & Rm'

CAPACITANCE LEVEL SENSOR FOR USE WITH VISCOUS, ELECTRICALLY CONDUCTIVE MATERIALS

DESCRIPTION

BACKGROUND OF THE INVENTION

This invention relates to a capacitance level sensor for sensing the level of a viscous, electrically conducting material in a tank.

In a prior capacitance sensing device shown in Townsend application Ser. No. 93,392, now U.S. Pat. No. 4,347,740, entitled "Capacitive Level Sensing Device" and assigned to the assignee of this application, an astable multivibrator develops an output signal having a period dependent upon the capacitance of a variable capacitor and the resistance of a charging resistor. Where the capacitor is a level measuring probe, the capacitance is dependent upon the level of material in a tank. In the Townsend circuit the resistance of the charging resistor is large compared to the resistance of the material within the track. For example, the charging resistor may have a value in the range of 10 kilohms. In the case of low viscosity, electrically insulative materials, this circuit provides an accurate indication of the level of the material within the tank. However, when one attempts to sense the level of a material which is electrically conductive and viscous so that a coating can build up on the probe, false readings can occur.

SUMMARY OF THE INVENTION

In accordance with the present invention, there is provided a level sensor for developing an output signal to indicate the true level of a viscous electrically conductive material in a tank.

The sensor includes an astable multivibrator or oscillator which is coupled to a charging resistor and to a variable capacitance, which may, for example, be a capacitive probe extending downwardly into a tank. The resistance of the charging resistor is selected so as to be substantially less than the resistance of the material within the tank.

The output of the astable multivibrator is a signal whose period is dependent upon the resistance of the charging resistor and the capacitance of the variable capacitor. The capacitance of the variable capacitor is in turn related to the level of the material in the tank.

Since the charging resistor has a relatively small value as compared with prior art devices, the frequency of the output signal developed by the astable multivibrator may be in the range of several megahertz. In order to accommodate this rapid switching, a high speed comparator is used to implement the multivibrator. Moreover, the output signal may be coupled to a frequency divider to allow transmission of information representing material level to a remote location over a two-wire cable.

The present invention is capable of detecting the true level of material in a tank, even when the material is viscous and electrically conductive.

DESCRIPTION OF THE PREFERRED EMBODIMENT

Figure 1:
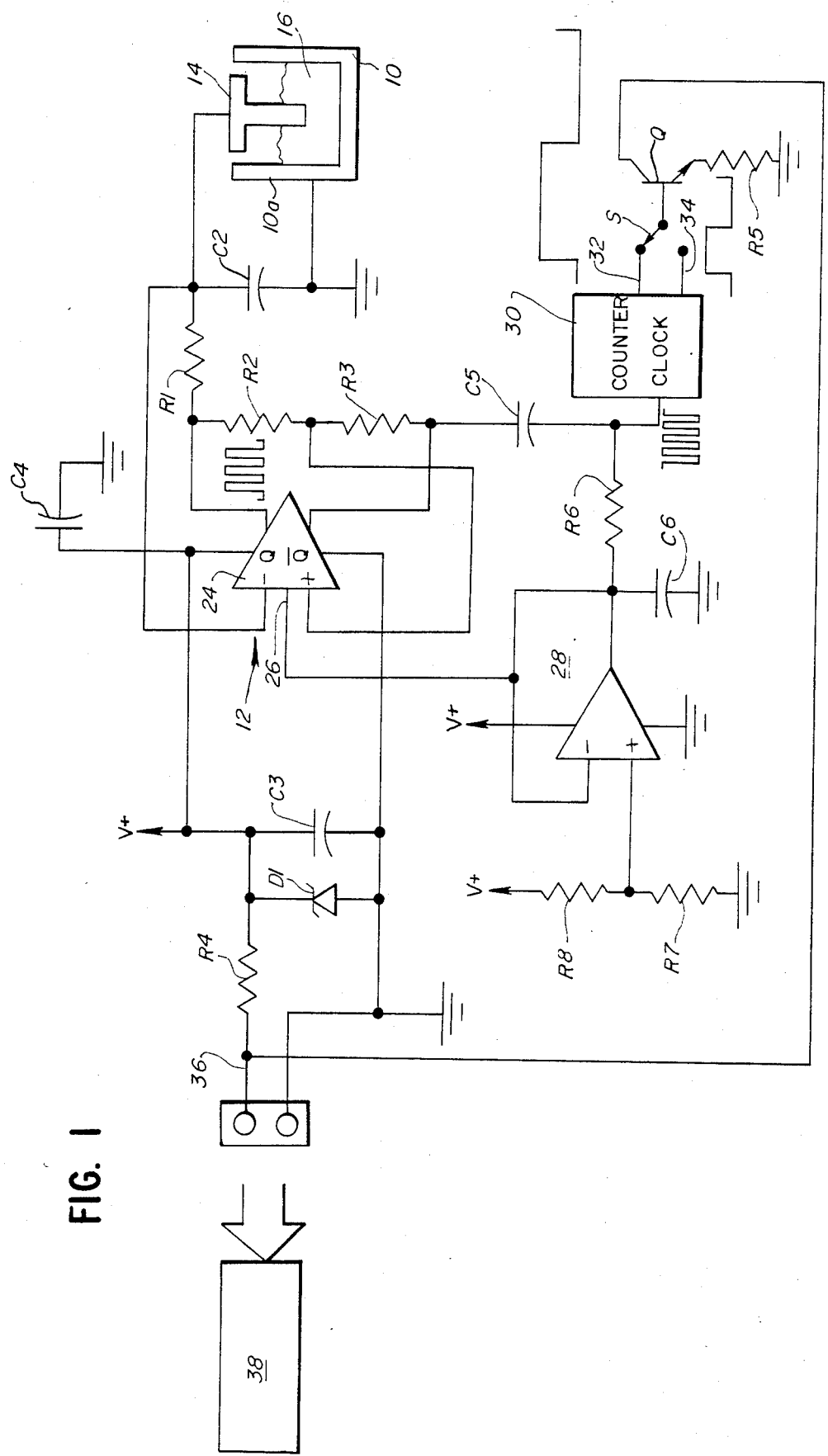
FIG. 1 is a schematic diagram of a capacitive level sensor according to the present invention.

Referring now to FIG. 1 there is illustrated a schematic diagram of circuitry for detecting the level of material, such as a liquid in a tank 10. It should be noted that the apparatus of the present invention is not limited to the detection of the level of media in a tank, but may be used to determine the value of an unknown capacitance, or may be used in other applications as would be evident to one skilled in the art.

The apparatus includes an astable multivibrator 12 coupled to a charging resistor R1 and to a capacitive probe 14 which is contained with the tank 10 so as to be contacted by media 16 which may be a viscous, electrically conductive liquid having an electrical resistance or an impedance with a resistive component.

The tank 10 includes electrically conductive walls 10a which are connected to ground potential. The capacitive probe 14 and the walls 10a of the process tank 10 comprise the electrodes of a variable capacitor 18, the capacitance of which is dependent upon the level of the liquid 16 within the tank 10.

Figure 2:
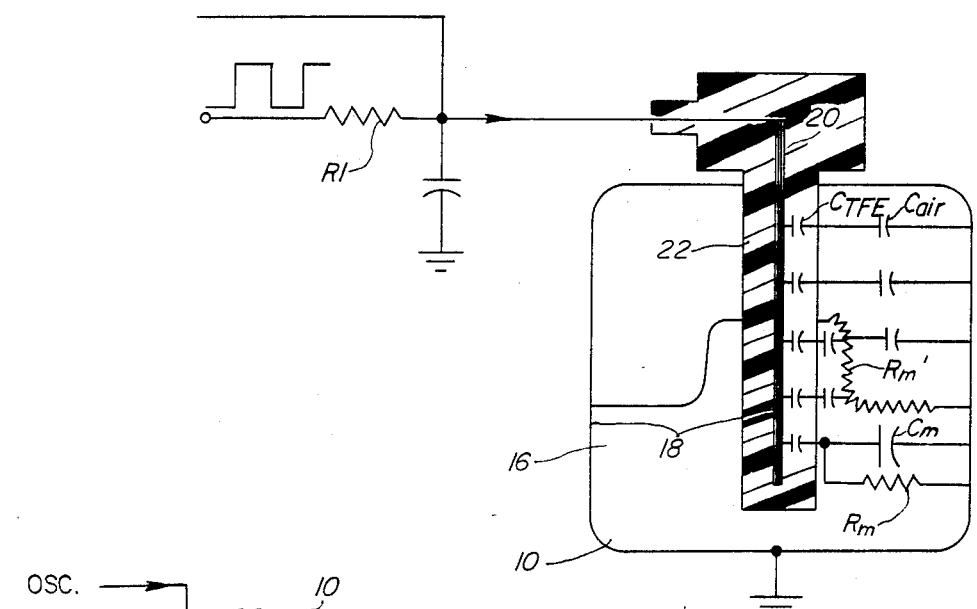
FIG. 2 is an equivalent circuit of the multivibrator and probe shown in FIG. 1, with the probe being disposed in conductive media which has left a coating thereon.

As seen more specifically in FIG. 2, the capacitive probe 14 includes an electrode 20 which is covered by a protective sheath or jacket 22. The jacket 22 may be formed from any suitable material which is resistant to the effects of the media 16 within the tank 10. In the preferred embodiment, the jacket 22 is made of Teflon, a material which is chemically inert and which has a low coefficient of friction to resist build up of the media 16 thereon.

Referring again to FIG. 1, in the preferred embodiment, the astable multivibrator 12 is implemented by means of a high speed voltage comparator 24, such as a National Semiconductor LM160 high speed differential comparator, which is capable of producing output signals in the range of several megahertz. This rapid switching rate is used because of the value of the resistor R1, the resistance of the media 16 within the tank 10 and the capacitance of the variable capacitor 18, as noted more specifically below.

A Q output of the comparator 24 is coupled through the resistor R1 to the electrode 20 of the probe 14. The electrode 20 is also coupled to the inverting input of the comparator 24. A capacitor C2 is coupled between the electrode 20 and the wall of the tank 10. The capacitor C2 limits the minimum period of the output signal from the comparator 24 to a predetermined value.

A pair of resistors R2 and R3 are coupled between the Q output of the comparator 24 and a $\overline{Q}$ output thereof. The $\overline{Q}$ output is 180° out of phase with respect to the Q output. The non-inverting input of the comparator 24 is coupled to the junction between resistors R2 and R3. A bias voltage is impressed on the Q and $\overline{Q}$ outputs of the comparator 24 by coupling a reference input 26 to the output of a voltage follower 28. In the preferred embodiment, the voltage connected to the reference input 26 is five volts.

Power for the various components is provided by a voltage supply V+. Voltage V+ is regulated by a resistor R4, pair of capacitors C3 and C4, and a zener diode D1 which deliver a semiconstant voltage to the power supply inputs of the comparator 24.

When the voltage on the non-inverting input of the comparator 24 is greater than the voltage on the inverting input, the output of the comparator 24 is in a high state, i.e. to within a millivolt of supply voltage V+. This voltage is coupled to the electrode 20 of the capacitive probe 14 through the resistor R1. The variable capacitor 18 then begins to charge to this voltage with a time constant determined by the value of the resistance R1, the resistance of the media 16 and the capacitance of the variable capacitor 18. As the variable capacitor 18 charges to the reference voltage V+, the voltage at the inverting input of the comparator 24 rises to a point where it exceeds the voltage on the non-inverting input. At this point, the Q output of the comparator 24 switches to a low state and the $\overline{Q}$ output switches to a high state in turn causing a discharging of the variable capacitor 18.

Moreover, the resistor R3 is selected to be larger than the resistor R2, and hence when the voltage at the $\overline{Q}$ output is higher than the voltage on the Q output, the voltage coupled to the non-inverting input drops, thereby establishing a new switching point for the comparator 24. In effect, the resistors R2 and R3 provide hysteresis for the switching of the comparator 24.

The use of a voltage divider consisting of the resistors R2 and R3 connected between the outputs Q and $\overline{Q}$ provide accurate switching points even when one or both of the levels of Q and $\overline{Q}$ change. That is, since the voltage coupled to the probe 14 and the non-inverting input of the comparator 24 is always a function of the proportion of one of the resistors R2 or R3 with respect to the sum of the resistances, changes in the levels of Q or $\overline{Q}$ have no effect on the switching of the outputs of the comparator 24.

The variable capacitor 18 and the capacitor C2 continue to discharge through the charging resistor R1 until the voltage on the inverting input falls below the voltage appearing at the non-inverting input of the comparator 24. At this point, the Q output switches to the high state while the $\overline{Q}$ output assumes the low state. Thereafter, the cycle repeats, with the period of the switching of the comparator outputs being determined by the capacitance of the variable capacitor 18, the resistance of the media 16 in the tank 10 and the resistance of the charging resistor R1.

The output from the comparator 24 is coupled through a capacitor C5 to a frequency divider such as a counter 30. The counter 30 includes a clock input and at least two outputs 32,34, either one of which is connectable to the base of a transistor Q through a switch S. The output 32, for example, may provide an output signal having a frequency equal to the frequency at the input of the counter 30 divided by 100, whereas the output 34 may develop a signal having a frequency equal to 1/10th the frequency of the input signals to the counter 30.

The transistor Q is used to provide output signal information to a remote location, and a current limiting resistor R5, used to adjust the current of the output signal, is connected between the emitter of Q and ground potential. The collector of Q is connected to a line 36, which may be a part of a two-wire conductor, for connection to a remote sensing amplifier 38 or other type of output device.

In the preferred embodiment, the electrical components shown in FIG. 1 have the following values or are identified by the following part numbers:

| Resistors (in ohms) | | Capacitors | |
|---|---|---|---|
| R1 | 806 | C2 | 100 picofarad |
| R2 | 1K | C3 | 15 microfarad |
| R3 | 10K | C4 | .15 microfarad |
| R4 | 22.1 | C5 | 50 picofarad |
| R5 | 470 | C6 | .15 microfarad |
| R6 | 33K | | |
| R7 | 10K | | |
| R8 | 10K | | |
| Q1 | 2N3904 | | |
| D1 | 1N4740A | | |

Referring now to FIG. 2, there is illustrated an equivalent probe circuit in an application wherein the level of an electrically conductive media is being sensed which has left a coating on the probe jacket. As shown in FIG. 2, the variable capacitor 18 has a capacitance which may be represented as the combination of capacitances $C_{TFE}$, $C_{air}$ and $C_m$ where $C_{TFE}$, $C_{air}$ and $C_m$ are the capacitances due to the Teflon jacket 22, the air above the level of the liquid in the tank and the media within the tank, respectively. Moreover, the resistance of the media 16 within the tank 10 may be represented as two components $R_m$ and $R_m'$, where $R_m$ is the resistance through the media itself and where $R_m'$ is the electrical resistance of the media along its surface.

Figure 3:
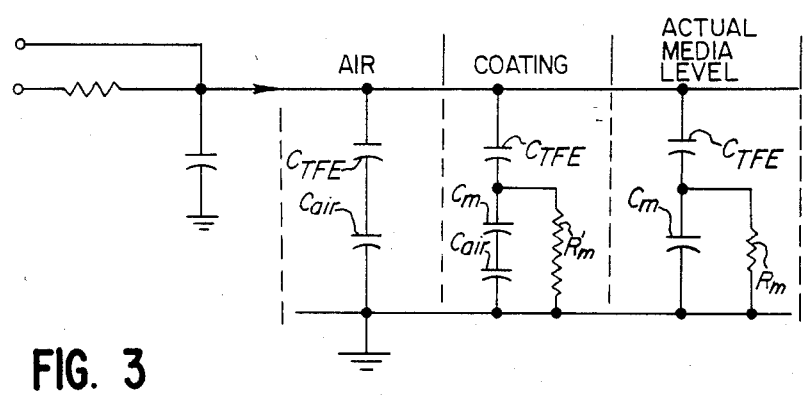
FIG. 3 is an electrical equivalent of the probe and tank shown in FIG. 2.

As shown in FIG. 3, an equivalent circuit for the probe 14 in combination with the tank 10 includes three lumped networks with the three networks representing different regions within the tank 10. These regions are the actual level of the media in the tank, the region in the tank where a coating is present on the probe jacket above the actual media level, and the region of the tank above the coating which is occupied only by air. The capacitance in the air region is equal to the series capacitance of $C_{TFE}$ and $C_{air}$. The equivalent network in the region between the air and the actual media level, i.e. the equivalent network in the region in which coating is on the probe, is equal to the capacitance $C_{TFE}$ in series with the parallel combination of the resistance $R_m'$ and the series combination of $C_m$ and $C_{air}$. The equivalent network in the region below the actual level of the media in the tank is equal to the capacitance $C_{TFE}$ in series with the parallel combination of $C_m$ and $R_m$.

Figure 4:
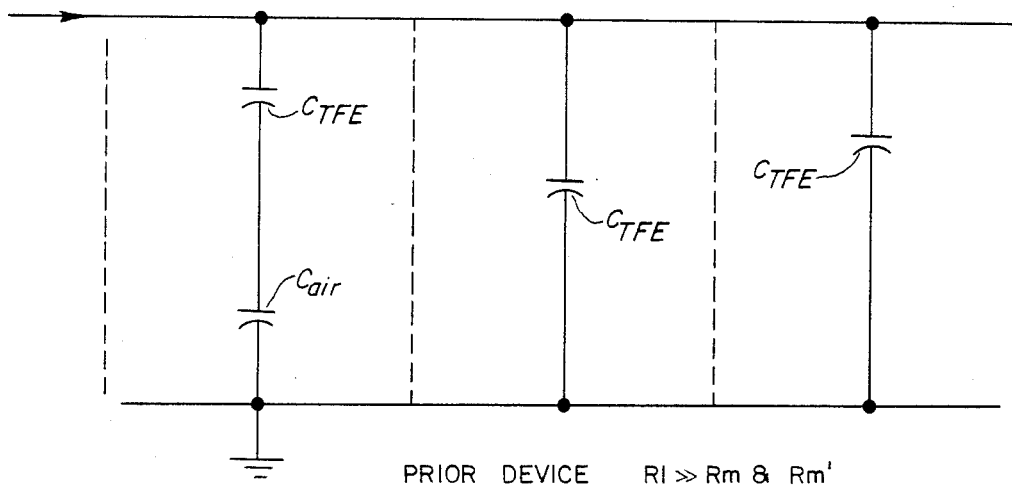
FIG. 4 is an approximation of the equivalent shown in FIG. 3 for prior types of devices where the value of the charging resistor is much greater than the resistance of the media in the tank.

Referring now to FIG. 4, in prior devices, the charging resistance R1 was much greater than the resistance $R_m$ of the media in the tank. Consequently, much of the voltage drop from the output of the oscillator occurred across the charging resistance R1 and hence every point along the capacitive probe 14 touched by the media was virtually at ground, including the coating. This results in an equivalent diagram as shown in FIG. 4. In this case, the capacitance $C_m$ has virtually a zero voltage drop across it, and consequently is extremely difficult to measure.

Figure 5:
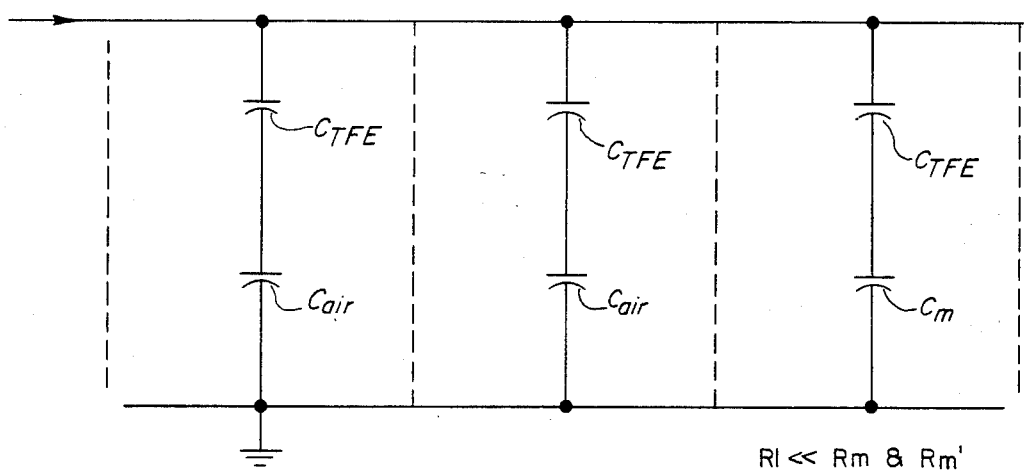
FIG. 5 is an approximation of the equivalent shown in FIG. 3 where the value of the charging resistance is much less than the resistance of the media in the tank.

In the present invention, and as shown in FIG. 5, the charging resistance R1 is made much smaller than the resistance of material $R_m$ and $R_m'$, in turn resulting in an approximation to the equivalent circuit as shown in FIG. 5. In this case, the capacitance due to the Teflon and due to the media can be measured with the media resistance $R_m$ and $R_m'$ not having nearly as great as influence on the measurement. This in turn allows precise measurement of media level height within the tank 10.

Figure 6:
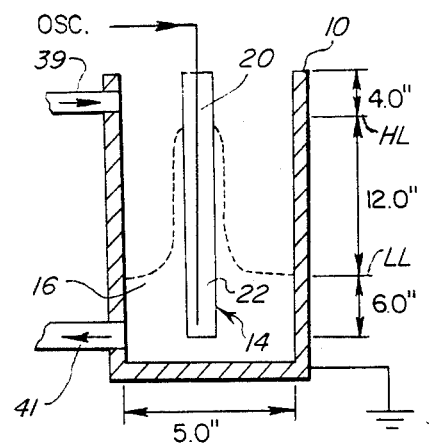
FIG. 6 is a sectional view, not to scale, of the capacitance level sensor of the present invention in an application wherein the level of molasses is to be detected.

FIG. 6 illustrates a test of the present invention. The test was conducted utilizing molasses as the media within the tank 10. A ⅜ inch outer diameter probe 14 approximately 22 inches long was disposed within a 5.0 inch inner diameter cylindrical conductive container or tank 10 such that a small gap separated the bottom of the probe 14 from the bottom of the container. The test was conducted to determine the change in period of the output signal as the molasses was added to and taken out of the tank through an inlet 39 and an outlet 41. Molasses was selected as the media 16 for this test since it is extremely viscous, especially at lower temperatures, and has a high water content rendering it highly electrically conductive.

The test was conducted first by measuring the period of the output signal from the multivibrator 12 without the probe 14 being connected thereto. The probe 14 was then connected to the multivibrator 12 and molasses was added to the container 10 until it reached a point six inches above the end of the probe 14 at a line designated LL. The period of the output signal was then noted. The level of the molasses was then increased up to a point 18 inches above the end of the probe up to a line designated HL. Again, the period of the output signal was noted.

Subsequently, the level of the molasses within the tank 10 was allowed to drop back to the line designated LL, in turn causing a ⅛ inch thick coating of molasses to remain on a 12 inch length of the probe 14 as shown by the dashed lines of FIG. 6. The period of the output signal was then recorded.

Subsequently, the probe 14 was replaced by a steel rod and the above procedure was repeated. During this time, a predetermined voltage was coupled across the steel rod and the tank 10 and the current flowing through the rod and molasses was measured. This procedure was conducted to determine the effective resistance of the media, i.e. the resistance approximately equal to the parallel equivalent of $R_m$ and $R_m'$.

The results of the above tests were as follows:

| MOLASSES LEVEL | Period T (microsecs.) | f (Mhz) | Eff. Resistance (ohms) |
|---|---|---|---|
| No probe connection | .550 | 1.818 | — |
| LL (no coating) | .680 | 1.471 | 14K |
| HL | .910 | 1.099 | 5K |
| LL (with coating) | .696 | 1.437 | 13.5K |

From the above test results, the change in period per inch of molasses height within the tank without a coating on the probe 14 is calculated as follows:

$$\Delta T/\text{in.} = \frac{(.910 - 680)\mu S}{12.0 \text{ inch}} = .0191 \ \mu S/\text{in.} \quad (1)$$

From this calculation, one can calculate the indicated level of the molasses with coating above the height LL by subtracting the period measured when the molasses is at the level LL with no coating on the probe from the period measured when the molasses is at the level LL with the coating as above described on the probe and by dividing this result by the results of equation (1) above:

$$\text{Indicated Level Above } LL \text{ (With Coating on Probe)} = \frac{.696 - .680}{.0191} \text{ in.} = .83 \text{ in.} \quad (2)$$

From this, one can calculate the percent error of the device by dividing the result of equation (2) by the distance between the levels HL and LL as follows:

$$\% \text{ Error} = \frac{.83 \text{ in.}}{12 \text{ in.}} \times 100 = 6.9\%$$

I claim:

1. A level sensor for developing an output signal indicative of the level of a viscous electrically conductive material in a tank, the material having an electrical impedance including a resistive component, comprising:
   a variable capacitor having first and second electrodes, the capacitance between the electrodes being a function of material level height in the tank;
   a charging resistor coupled to the variable capacitor having a resistance which is selected to be substantially less than the resistive component of the material between the first and second electrodes; and
   an oscillator which includes the charging resistor and the variable capacitor for developing an output signal having a period which is dependent upon the resistive component of the material between the first and second electrodes, the resistance of the charging resistor and the capacitance of the variable capacitor so that the output signal period is substantially independent of build up of material on the variable capacitor.

2. The level sensor of claim 1, wherein the oscillator includes a comparator having a first output Q and a second output $\bar{Q}$ 180° out of phase with respect to one another, and wherein the charging resistor and the variable capacitor are coupled to the Q output.

3. The level sensor of claim 2, wherein first and second resistors are connected between the Q and $\bar{Q}$ outputs, and wherein the junction between the first and second resistors is coupled to a non-inverting input of the comparator.

4. The level sensor of claim 2 wherein the variable capacitor is connected to an inverting input of the comparator.

5. The level sensor of claim 2, further including means for impressing a bias voltage on the Q and $\bar{Q}$ outputs.

6. The level sensor of claim 1, wherein the output signal of the oscillator is coupled to a frequency divider for reducing the frequency of the output signal.

7. A capacitance sensor for measuring the capacitance of a variable capacitor having first and second electrodes wherein material having an electrical impedance including a resistive component is present between the electrodes, comprising:
   a charging resistor having a resistance which is selected to be substantially less than the resistive component of the material between the electrodes; and an oscillator including the charging resistor and the variable capacitor for developing an output signal the period of which is dependent upon the capacitance of the variable capacitor, the resistive component of the material between the electrodes and the resistance of the resistor so that the output signal period is substantially independent of build up of material on the variable capacitor.

8. The sensor of claim 7, wherein the oscillator includes first and second outputs 180° out of phase with one another wherein the first output is coupled to the variable capacitor through the charging resistor.

9. The sensor of claim 8, wherein the oscillator includes a high speed comparator having an inverting input coupled to the variable capacitor.

10. The sensor of claim 8, wherein the oscillator includes:
first and second resistors coupled between the first and second outputs; and
a comparator having a non-inverting input coupled to the junction between the first and second resistors.

11. The sensor of claim 7, wherein the output signal is coupled to a frequency divider for reducing the frequency thereof.

12. A level sensor for developing an output signal indicative of the level of a viscous electrically conductive material in a tank, the material having an electrical impedance with a resistive component, comprising:

a variable capacitor having first and second electrodes, the capacitance of which is a function of material level height in the tank;

a charging resistor coupled to the variable capacitor having a resistance selected to be at least an order of magnitude less than the resistive component of the material between the first and second electrodes; and an oscillator including the charging resistor and the variable capacitor for developing an output signal having a period which is dependent upon the resistive component of the material between the first and second electrodes, the resistance of the resistor and the capacitance of the variable capacitor so that the output signal period is substantially independent of material build up on the variable capacitor, the oscillator further including a comparator having a first output Q and a second output $\overline{Q}$, 180° out of phase with respect to one another, the comparator including an inverting input and a noninverting input, wherein the charging resistor and the variable capacitor are coupled to the Q output and first and second resistors are connected between the Q and $\overline{Q}$ outputs and wherein the junction between the first and second resistors is coupled to the noninverting input of the comparator and the variable capacitor is connected to the inverting input of the comparator.

* * * * *